United States Patent [19]

Lal et al.

[11] Patent Number: 6,007,924

[45] Date of Patent: Dec. 28, 1999

[54] MAGNETIC RECORDING MEDIUM HAVING A MULTILAYER MAGNETIC RECORDING STRUCTURE INCLUDING A 10-30 ANGSTROM COCR INTERLAYER

[75] Inventors: Brij Bihari Lal, San Jose; Sudhir S. Malhotra, Fremont; Michael A. Russak, Los Gatos, all of Calif.

[73] Assignee: HMT Technology Corporation, Fremont, Calif.

[21] Appl. No.: 08/887,348

[22] Filed: Jul. 2, 1997

Related U.S. Application Data

[63] Continuation-in-part of application No. 08/825,471, Mar. 28, 1997, Pat. No. 5,922,442, and application No. 08/634,895, Apr. 26, 1996.

[51] Int. Cl.$^6$ ....................................................... G11B 5/66
[52] U.S. Cl. .......................... 428/611; 428/336; 428/668; 428/678; 428/694 T; 428/694 TM; 428/694 TS; 204/192.2; 427/131; 427/132
[58] Field of Search ..................................... 428/611, 668, 428/678, 336, 694 T, 694 TM, 694 TS, 900; 204/192.2; 427/131, 132

[56] References Cited

U.S. PATENT DOCUMENTS

| | | | |
|---|---|---|---|
| 5,147,732 | 9/1992 | Shiroishi et al. | 428/668 |
| 5,462,796 | 10/1995 | Teng et al. | 428/336 |
| 5,736,262 | 4/1998 | Ohkijima et al. | 428/611 |

OTHER PUBLICATIONS

Cord, B. et al., "Sputtering of High Coercivity/Low Noise CoCrTa Bilayered Hard Disks in a Manufacturing System," *IEEE Transcations on Magnetics*. 29: (06) Nov. 3694–3696 (1993).

Hata, H. et al., "Magnetic and Recording Characteristics of Multilayer CoNiCr Thin Film Media," *IEEE Transactions on Magnetics*. 26: (05) Sep. 2709–2711 (1990).

Kelly, P.E. et al., "Switching Mechanisms in Cobalt–Phosphorus Thin Films," *IEEE Transactions on Magnetics*. 25: (05) Sep. 3881–3883 (1989).

Lal, B.B. et al., "Magnetic and Recording Properties of Monolayer and Multilayer Thin–Film Media by Using Composite Targets," *Journal of Applied Physics*. 79: (08) Apr. 5336–5338 (1996).

Mayo, P.I., et al., "A Magnetic Evaluation of Interaction and Noise Characteristics of CoNiCr Thin Films," *J. Appl. Phys.* 69: (15) Apr. 4733–4735 (1991).

Ranjan, R. et al., "Magnetic, Recording and Crystalline Properties of Multilayered Longitudinal Thin–Film Media," *J. Appl. Phys.* 69: (08) Apr. 4727–4729 (1991).

Teng, E. and Eltoukhy, A., "Flash Chromium Interlayer for High Performance Disks with Superior Noise and Coercivity Squareness," *IEEE Transactions on Magnetics*. 29: (06) Nov. 3679–3681 (1993).

Zen Fang, L.L. and Lambeth, D.N., "New High Coercivity Cobalt Alloy Thin Film Medium Structure for Longitudinal Recording," *Appl. Phys. Lett.* 65: (24) 3137–3139 (1994).

*Primary Examiner*—Stevan A. Resan
*Attorney, Agent, or Firm*—Judy M. Mohr; Dehlinger & Associates

[57] ABSTRACT

An improvement in a magnetic recording medium having an underlayer and first and second magnetic recording layers is described. The improvement, effective to reduce media noise, includes deposition of an interlayer between the first and second magnetic recording layers. The interlayer is deposited to a thickness of between 5–50 Å and is composed of an CoCr-based alloy having a defined saturation magnetization.

16 Claims, 8 Drawing Sheets

MAGNETIC RECORDING MEDIUM HAVING A MULTILAYER MAGNETIC RECORDING STRUCTURE INCLUDING A 10-30 ANGSTROM COCR INTERLAYER

This is a continuation-in-part application of U.S. application Ser. No. 08/825,471 for "MAGNETIC RECORDING MEDIUM HAVING AN INTERLAYER", filed Mar. 28, 1997, now U.S. Pat. No. 5,922,442 and of U.S. application Ser. No. 08/634,895 for "MAGNETIC RECORDING MEDIUM WITH A CRRU UNDERLAYER", filed Apr. 26, 1996 pending.

FIELD OF THE INVENTION

The present invention relates to a magnetic recording medium having an interlayer deposited between a first magnetic recording layer and a second magnetic recording layer.

REFERENCES

Cord, B., et al., *IEEE Trans. Magn.* 29:3694 (1993).

Doerner, M. F., et al., *IEEE Trans. Mag.* 29(6):3667 (1993).

Hata, H., et al., *J. Appl. Phys.* 67(9):4692 (1990a).

Hata, H., et al., *IEEE Trans. Magn.* 26(5):2709 (1990b).

Jorgensen, F., THE COMPLETE HANDBOOK OF MAGNETIC RECORDING, TAB Books, Blue Ridge Summit, Pa. (1988).

Kelly, P. E., et al., *IEEE Trans. Mag.* 25(5):3881–3883 (1989).

Lambert, S. E., et al., *IEEE Trans. Mag.* 26(5): 2706 (1990).

Mayo, P. I., et al., J. Appl. Phys. 69(8):4733–4835 (1991).

Mee, C. D. and Daniel, E. D., MAGNETIC RECORDING VOLUME I: TECHNOLOGY, McGraw-Hill Book Co., San Francisco (1987).

Ranjan, R., et al., *J. Appl. Phys.* 69(8):4272–4729 (1991).

Sanders, I. L., et al., *IEEE Trans. Mag.* 25(5):3869 (1989).

Yogi, T., et al., *IEEE Trans. Magn.* 26:2271 (1991).

BACKGROUND OF THE INVENTION

Magnetic recording media having a plurality of magnetic recording layers separated by non-magnetic isolation layers have been shown to exhibit an improvement in some magnetic recording properties, in particular a reduction in media noise, hence an improved signal-to-noise ratio (Hata, et al., 1990a, 1990b; Ranjan, et al., 1991). The reduction in media noise is often attributed to the decrease in thickness of the magnetic layers in such media, since inter-granular exchange coupling is reduced in thinner films (Hata, et al., 1990b; Ranjan, et al., 1991; Sanders, et al., 1989).

However, as the magnetic recording layer decreases in thickness and as the inter-granular exchange coupling is reduced, other magnetic recording properties are compromised. For example, the signal amplitude is reduced in proportion to film thickness (Lambert, et al., 1990), and thinner magnetic recording layers may provide insufficient amplitude of read-back signal because of a low remanence thickness product (Hata, et al., 1990a). Further, a decrease in intergrain exchange coupling is accompanied by a reduction in coercive squareness, S* (Hata, et al., 1990a, 1990b). A consequence of a decrease in coercive squareness is a degradation in overwrite with a larger field required to saturate the medium (Yogi, et al., 1991).

Another factor contributing to degradation in overwrite in magnetic recording media having a multilayer recording structure is that second and subsequent magnetic layers have a progressively lower coercivity than the first magnetic layers, due primarily to the progressively decreasing substrate temperature during the sputtering process (Cord, et al., 1993). The coercivity differential in multilayer media makes saturation of the medium by the read/write head more difficult, causing poor overwrite performance.

SUMMARY OF THE INVENTION

Accordingly, it is an object of the invention to provide a magnetic recording medium having improved magnetic recording properties by including in the medium an interlayer deposited between a first and a second magnetic recording layers.

It is another object of the present invention to provide a magnetic medium having such an interlayer, which functions to reduce exchange coupling and to improve lattice matching with the second magnetic layer, thereby enhancing magnetic recording properties, in particular reducing media noise with no loss in overwrite performance.

In one aspect, the invention includes an improvement in a magnetic recording medium formed on a rigid substrate and having an underlayer and first and second magnetic recording layers deposited on the underlayer. The improvement, which is effective to reduce noise of the medium, comprises an interlayer disposed between said first and second magnetic recording layers, said interlayer (i) composed of a CoCr-based alloy having a saturation magnetization of between 10–50 emu/cm$^3$ and (ii) having a thickness of between 5–50 Å.

In one embodiment, the interlayer and the first and second magnetic layers are formed from a CoCr-based alloy having the same elemental constituents in different proportions. For example, in one embodiment, the interlayer is composed of an alloy containing 50–60 atomic percent cobalt, 3–10 atomic percent nickel, 24–50 atomic percent chromium and 1–10 atomic percent tantalum and the magnetic layers are composed of an alloy containing 60–80 atomic percent cobalt, 3–10 atomic percent nickel, 10–20 atomic percent chromium and 2–10 atomic percent tantalum.

The underlayer in the medium, in one embodiment, is composed of chromium. In another embodiment, the underlayer is composed of an alloy containing between about 2–20% ruthenium and remainder chromium, more preferably between 2–10% ruthenium and remainder chromium.

In another aspect, the invention includes an improvement in a method of producing a magnetic recording medium by sputtering onto a substrate an underlayer and a first magnetic thin-film layer and a second magnetic thin-film layer. The improvement includes depositing by sputter deposition an interlayer between the first and second magnetic layers, where the interlayer (i) is composed of a CoCr-based alloy having a saturation magnetization of between 10–50 emu/cm$^3$ and (ii) has a thickness of between 5–50 Å.

These and other objects and features of the invention will be more fully appreciated when the following detailed description of the invention is read in conjunction with the accompanying drawings.

DETAILED DESCRIPTION OF THE INVENTION

I. TNIN-FILM MEDIUM

Figure 1:
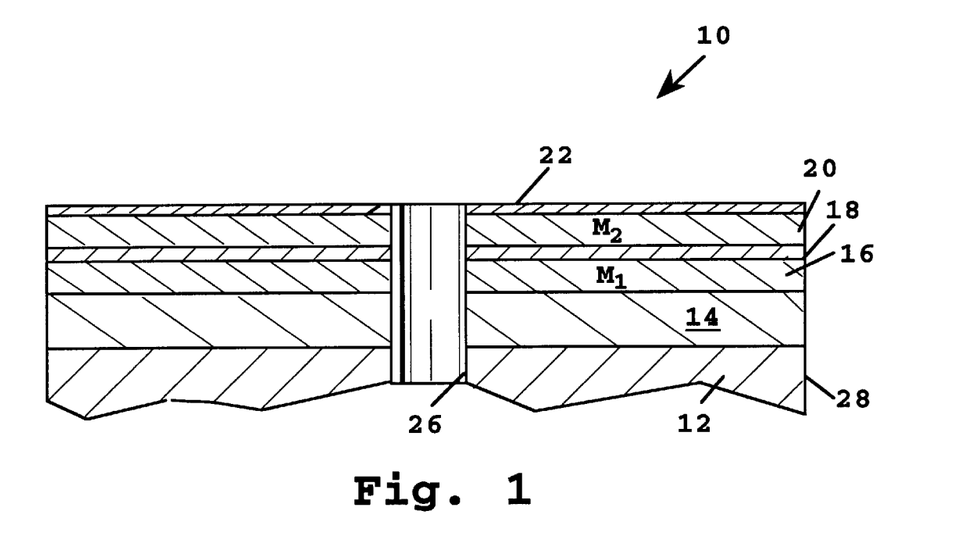
FIG. 1 is a cross-sectional view of a thin-film magnetic recording medium prepared in accordance with the present invention.

FIG. 1 shows in cross sectional view, a fragmentary portion of a longitudinal thin-film medium or disc 10 formed in accordance with the invention. The disc generally includes a rigid substrate 12, and forming successive thin-film layers over the substrate, a crystalline underlayer 14, a first magnetic ($M_1$) thin-film layer 16, an interlayer 18, a second magnetic ($M_2$) thin-film recording layer 20, and a protective carbon overcoat 22. It will be appreciated that the disc is symmetrical with respect to its upper and lower surfaces, the lower portion of the disc not being shown in the figure.

Substrate 12 may be a textured substrate, such as a conventional surface-coated, textured metal substrate of the type used commonly for digital recording medium, or a textured glass or ceramic substrate. An example of a metal substrate is an aluminum substrate. Typically, aluminum substrates are first plated with a selected alloy plating, such as a nickel/phosphorus plating, to achieve a requisite surface hardness, with the thickness of the plating being about 300–700 micro-inches. An example of a glass-ceramic substrate is a TS-10 substrate available from Ohara Inc. (Sagumihara, Kanagawa, Japan). Such a non-metallic substrate may be initially coated with a metal sublayer, such as a Ti, Cr, or Cr-alloy sublayer.

Conventional size substrates have outer diameters of 130 mm (5.25 inches), 95 mm (3.5 inches) or 65 mm (2.5 inches) with corresponding inner diameters of 40 mm (1.57 inches), 25 mm (0.98 inches) and 10 mm (0.79 inches), respectively. The discs used for the preferred embodiment of the present invention have inner diameters of 0.984 inches and outer diameters of 3.74 inches. The inner and outer edges of the disc which define these diameters are indicated at 26, 28, respectively, in FIG. 1.

Underlayer 14 is preferably formed of a chromium-based alloy, which, as used herein includes chromium (Cr) and alloys containing greater than about 80% chromium. Exemplary alloys include CrV, CrSi, CrGd, CrMo and CrRu. In a preferred embodiment, the underlayer is a CrRu alloy containing between about 2–20% ruthenium, more preferably 2–10% ruthenium, and remainder chromium. Alloy percentages reported herein are atomic weight percentages, for example, a 90/10 CrRu alloy refers to an alloy of 90 atomic percent chromium and 10 atomic percent ruthenium.

It will be appreciated that the underlayer, when formed of chromium or of a binary alloy such as CrRu, may also contain minor amounts of other elements. For example, any of the following elements when added in amounts of less than about 5%, preferably less than about 3%, to the CrRu alloy may be suitable for the underlayer of the invention: Si, Cu, Pt, Al, Mo, Ta, Ge, B, Ni, W, V, Hf, Nb, Zr, Ti, Os, Pd, Sb and C.

The underlayer has a thickness of between about 100–3,000 Å, more preferably between about 150–1,000 Å, most preferably between 200–800 Å.

Magnetic thin-film layers 16 ($M_1$), 20 ($M_2$) are formed by sputter deposition of a cobalt-based alloy—that is, an alloy containing at least about 50% cobalt. Preferable alloys include cobalt-based alloys containing nickel, platinum and/or tantalum. A preferred alloy is CoCrNiTa having between 70–80 atomic percent cobalt, 3–10 atomic percent nickel, 10–20 atomic percent chromium and 2–10 atomic percent tantalum. The CoCrNiTa alloy used in experiments in support of the present invention was composed of 72% Co, 8% Ni, 14% Cr and 6% Ta. Another exemplary alloy is CoCrPtTa, composed of 70–90 atomic percent cobalt, 3–15 atomic percent platinum, 2–20 atomic percent chromium and 1–10 atomic percent tantalum. These alloys are characterized by high-coercivity, high magnetic remanence, and low permeability, and are widely used in thin-film longitudinal recording media.

With continuing reference to FIG. 1, and according to an important aspect of the invention, the medium includes an interlayer, such as interlayer 18, which is deposited between first magnetic layer 16 and second magnetic layer 20. The interlayer is composed of a cobalt/chromium-based (CoCr-based) alloy, which, as used herein refers to an alloy containing at least about 24% Cr, preferably 24–50% Cr, more preferably 30–50% Cr and most preferably 30–40% Cr and at least about 0% cobalt. Importantly, the CoCr-based alloy forming the interlayer has a saturation magnetization of between about 10–50 emu/cm$^3$, which is considerably lower than that of materials used for formation of the magnetic recording layers, such as cobalt, 1430 emu/cm$^3$; nickel 483 emu/cm$^3$ and iron 1710 emu/cm$^3$ (Mee and Daniel, 1987).

Saturation magnetization of magnetic materials can be found in the literature, for example in MAGNETIC RECORDING VOLUME I: TECHNOLOGY by Mee and Daniel (1987) or in the literature, such as in the paper by Doerner, et al. (1993) where the saturation magnetization of CoPtCr as a function of Cr concentration is reported. Saturation magnetization values of magnetic materials can also be determined experimentally from the hysteresis loop obtained using a vibrating sample magnetometer, as described, for example, in Jorgensen (1990).

In experiments performed in support of the present invention, as discussed below, magnetic media were prepared with an interlayer composed of CoCrNiTa (53/36/8/3). The relatively high chromium content in the alloy results in a saturation magnetization considerably less than other cobalt alloys conventionally used for magnetic recording layers, such as CoCrNiTa (74/12/10/4).

In the present invention, a preferred CoCr-based alloy for use in forming the interlayer is a CoCrNiTa alloy containing between 50–60 atomic percent cobalt, 24–50 atomic percent chromium, 5–10 atomic percent nickel, and 1–10 atomic percent tantalum. Another preferred alloy is CoCrTa containing between 50–70 atomic percent cobalt, 24–40 atomic percent chromium and 2–10 atomic percent tantalum.

In one embodiment of the invention, the interlayer and the magnetic layers are formed of a CoCr-based alloy and co-based alloys having the same elemental constituents, but where those constituents are in different proportions. For example, in experiments performed in support of the invention, described below, media were formed having an interlayer of CoCrNiTa (53/36/8/3) and a magnetic recording layer of CoCrNiTa (72/14/8/6).

The alloy composition in the interlayer of the present invention is homogeneous through the thickness of the layer. The interlayer forms a discrete layer between the underlayer and the magnetic layer and has approximately the same alloy composition at the first magnetic layer-interlayer boundary as at the second magnetic layer-interlayer boundary.

The interlayer is deposited to a thickness of between about 5–50 Å, more preferably between 5–30 Å and most preferably between 5–20 Å.

It will be appreciated that the medium may contain more that two magnetic thin-film layers. For example, the medium may include three, four or more magnetic layers separated by two, three or more interlayers.

Overcoat 22 is composed of a material giving wear-resistant, protective properties to the medium. Preferably, the overcoat is composed of C, Zr, $ZrO_2$, Si, SiC, or $SiO_2$, most preferably of carbon, which may include carbon produced by sputtering in an argon atmosphere containing nitrogen or hydrogen, for an overcoat containing hydrogen and/or nitrogen. The overcoat thickness is preferably between about 100–400 Å.

After sputter deposition of the overcoat, the medium is typically coated with a lubricant, such as a convention, commercially available perfluoropolyether lubricant.

II. METHOD OF PRODUCING THE MEDIUM

Figure 2:
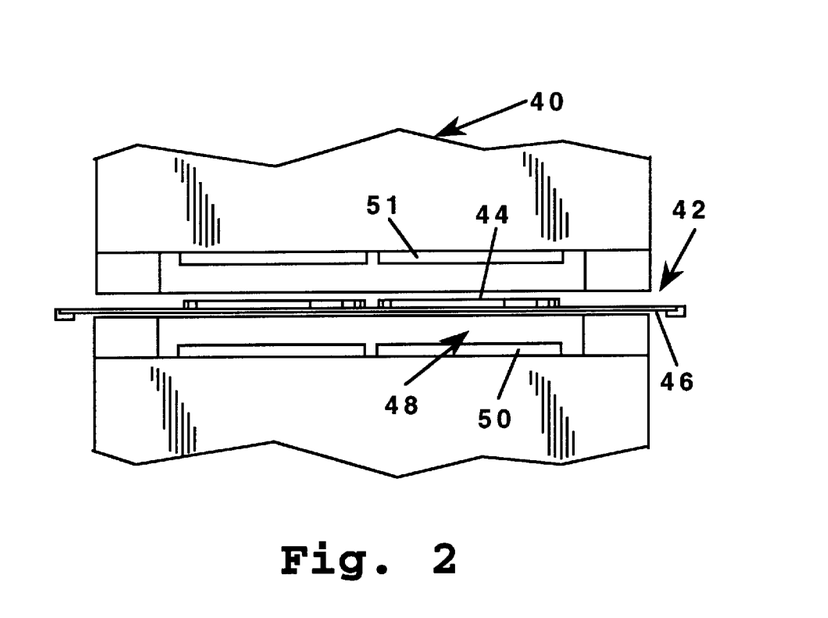
FIG. 2 is a schematic view of a sputtering apparatus used in producing the thin-film medium of the invention.

FIG. 2 shows, in schematic view, a portion of a sputtering apparatus 40 which is used, in the method of the invention, for producing the thin-film medium described in Section I. The apparatus includes a vacuum chamber 42 having at least five stations at which sputtering or heating operations occur. A heating station (not shown) at the upstream end of the chamber has a plurality of infrared lights which are arrayed for heating both sides of a substrate, such as substrate 44, carried through the station in the chamber on an aluminum disc holder or pallet 46.

Just downstream of the heating station is a first sputtering station 48 at which an underlayer is formed on a substrate, in a manner to be described. The station includes a pair of targets, such as targets 50, 51, effective to sputter onto opposite sides of substrate 44. The targets in station 48 are composed of a material listed above for use in forming the underlayer, preferably pure chromium targets or chromium alloy targets, containing predominately chromium.

A second sputtering station (not shown) downstream of chamber 48 is designed for sputtering the first magnetic layer $M_1$ directly onto the underlayer. The station includes a pair of sputtering targets formed of a Co-based alloy such as those discussed above. The targets are formed and shaped for use by conventional metallurgical methods.

A third sputtering station downstream from the second sputtering chamber is designed for sputtering an interlayer onto the first magnetic layer. The targets in this station are formed of the paramagnetic materials discussed above. The interlayer is sputtered to a thickness between about 5–50 Å by well-known methods for controlling the thickness of sputtered films in a conventional sputtering apparatus, such as sputter pressure, target power, voltage, deposition time, etc.

The upper magnetic recording layer ($M_2$) is deposited onto the interlayer in another sputtering station (not shown in FIG. 2) similar to the second station used to form layer $M_1$, discussed above.

Also included in the apparatus is a DC power source (not shown) for placing a selected voltage potential between the sputtering targets and the substrate. The power source is designed to place a DC negative bias on the substrate of −50 to −600 volts, measured with respect to target in the sputtering chambers.

The carbon overcoat in the medium is produced by sputtering from a graphite target in a sputtering stations further downstream (not shown) in the apparatus.

The basic sputtering apparatus is preferably a commercial system, such as in available from VarianIntevac (Santa Clara, Ca.), Circuits Processing Apparatus (Fremont, Ca.), ULVAC (Japan), Leybald Heraeus (Germany), VACTEC (Boulder, Co.), Anelva (Japan) or Materials Research Corporation (Albany, N.Y.). These systems are double-sided, in-line, high-throughput machines having two interlocking systems, for loading and unloading.

In operation, the sputtering chamber is evacuated to pressure of about $10^{-7}$ Torr, and argon gas is introduced into the chamber to a final sputtering pressure of 5–20 mTorr. A preferred argon gas pressure is 6 mTorr.

The substrate is heated in the heating station to a selected temperature before advancing into the sputtering chambers. The heating conditions in the apparatus are preferably adjusted to achieve a substrate temperature of between about 150° C. and 300° C., and preferably about 250° C.

The heated substrate is moved into the first sputtering chamber, and the underlayer is sputtered onto the disc surface. In the experiments performed in support of the invention, media were prepared having an underlayer of CrRu (90/10) or of chromium, deposited to a selected thickness of typically about 400 Å.

The underlayer-coated substrate is shuttled downstream to a second sputtering chamber for deposition of the first magnetic layer. The first magnetic recording layer is formed by sputtering from a target composed of a cobalt-based alloy, such as those described above and is deposited to a thickness of between about 100–800 Å.

The coated substrate is next shuttled downstream to another sputtering chamber for deposition of the interlayer. The interlayer is formed by sputtering from a target composed of a cobalt-based alloy, such as those described above and is deposited to a thickness of between about 5–50 Å, more preferably between 5–30 Å.

Over the interlayer, a second magnetic recording layer is deposited as described for the first magnetic recording layer.

After deposition of the second magnetic recording layer, the protective overcoat is deposited in another sputtering chamber.

III. MEDIA PROPERTIES

Magnetic recording media having an interlayer disposed between first and second magnetic recording layers, as described above, were prepared in support of the present invention. In the experiments described below, magnetic recording media were formed on a NiP-plated aluminum substrate and included a chromium underlayer, a first magnetic layer of CoCrNiTa (74/12/10/4), a paramagnetic interlayer formed of CoCrNiTa (53/36/8/3), a second magnetic layer of CoCrNiTa (74/12/10/4), a carbon overcoat and coating of lubricant. Typically, the thicknesses of the first and second magnetic layers was about 140 Å. The thickness of the chromium underlayer and the interlayer were as indicated.

Table 1 shows the static magnetic properties (measured by vibrating sample magnetometry) of media having an interlayer varying in thickness from 10–30 Å (Medium Nos. 2–6) and compared to medium lacking an interlayer (Medium No. 1). The thickness of the chromium underlayer was constant at 400 Å in all six media.

TABLE 1

| Medium No. | Cr-Underlayer Thick. (Å) | Interlayer Thick. (Å) | He (Oe) | SR | S* | Mrt (menu/cm³) | OR |
|---|---|---|---|---|---|---|---|
| 1 | 400 | 0 | 2415 | 0.90 | 0.82 | 1.06 | 1.55 |
| 2 | 400 | 10 | 2121 | 0.95 | 0.89 | 1.02 | 1.66 |
| 3 | 400 | 12 | 2120 | 0.91 | 0.89 | 1.03 | 1.65 |
| 4 | 400 | 15 | 2156 | 0.91 | 0.87 | 1.04 | 1.70 |
| 5 | 400 | 20 | 2164 | 0.92 | 0.85 | 1.03 | 1.65 |
| 6 | 400 | 30 | 2222 | 0.91 | 0.85 | 1.0 | 1.61 |

Figure 3:
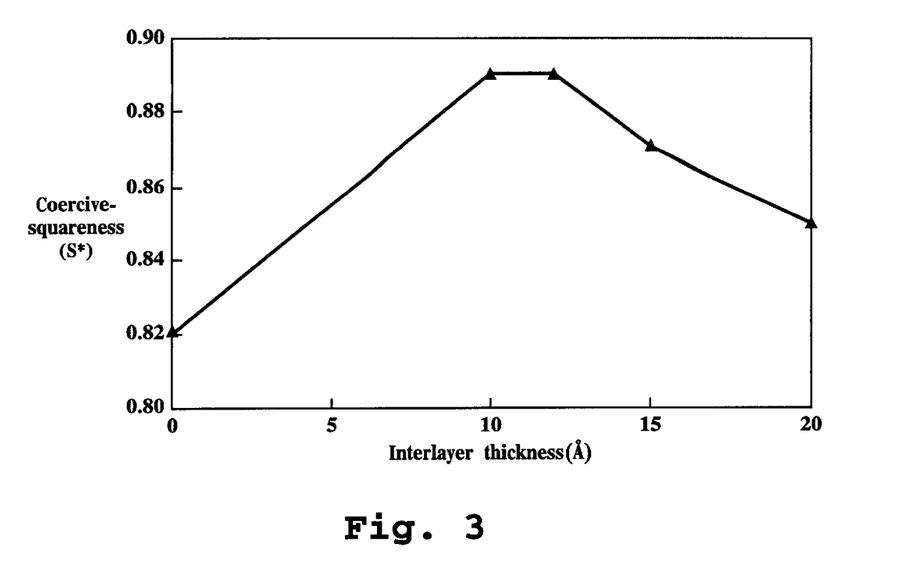
FIG. 3 is a plot of coercive squareness (S*) as a function of interlayer thickness, in Å, for media prepared in accordance with the invention.
Figure 4:
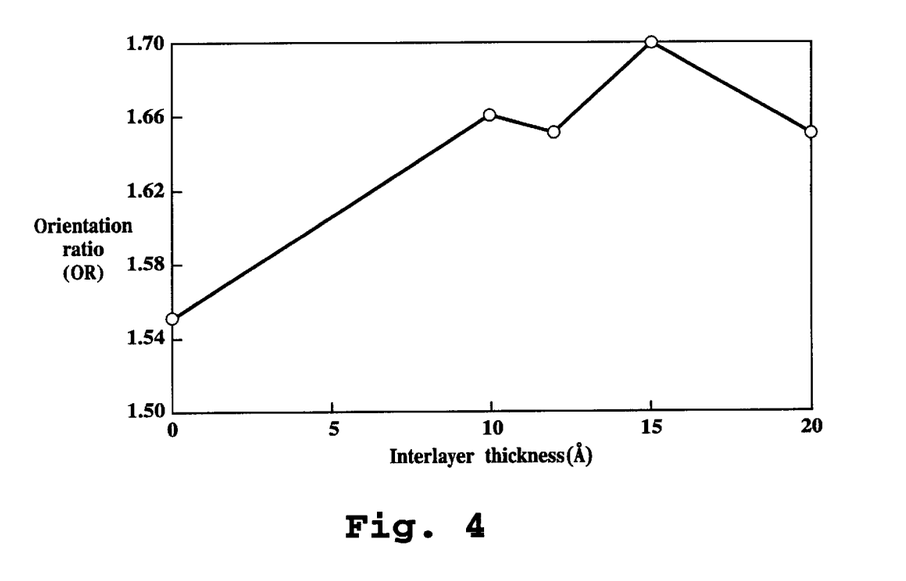
FIG. 4 is a plot of orientation ratio (OR) as a function of interlayer thickness, in Å, for media prepared in accordance with the invention.

As seen, there is a small decrease in coercivity (Hc) in media having a CoCrNiTa interlayer. However, an improvement in squareness ratio (SR), coercivity squareness (S*) and orientation ratio (OR) are achieved, with the results for S* and OR shown graphically in FIGS. 3 and 4, respectively. As seen in the figures, a substantial increase in coercive squareness (FIG. 3) is achieved when the thickness of the paramagnetic interlayer is between about 5–15 Å. FIG. 4 shows that the orientation ratio improves as the thickness of the interlayer increases to about 15–20 Å.

Figure 5A:
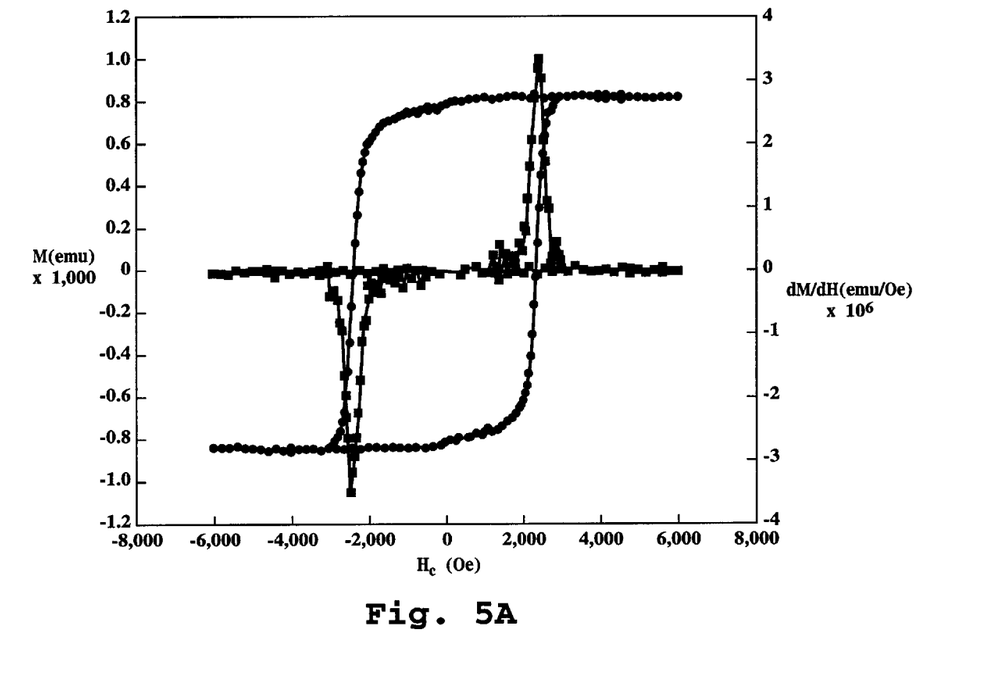
FIGS. 5A–5B are hysteresis loops and differential hysteresis loops for media prepared with no interlayer (FIG. 5A) and with a 20 Å interlayer (FIG. 5B)
Figure 5B:
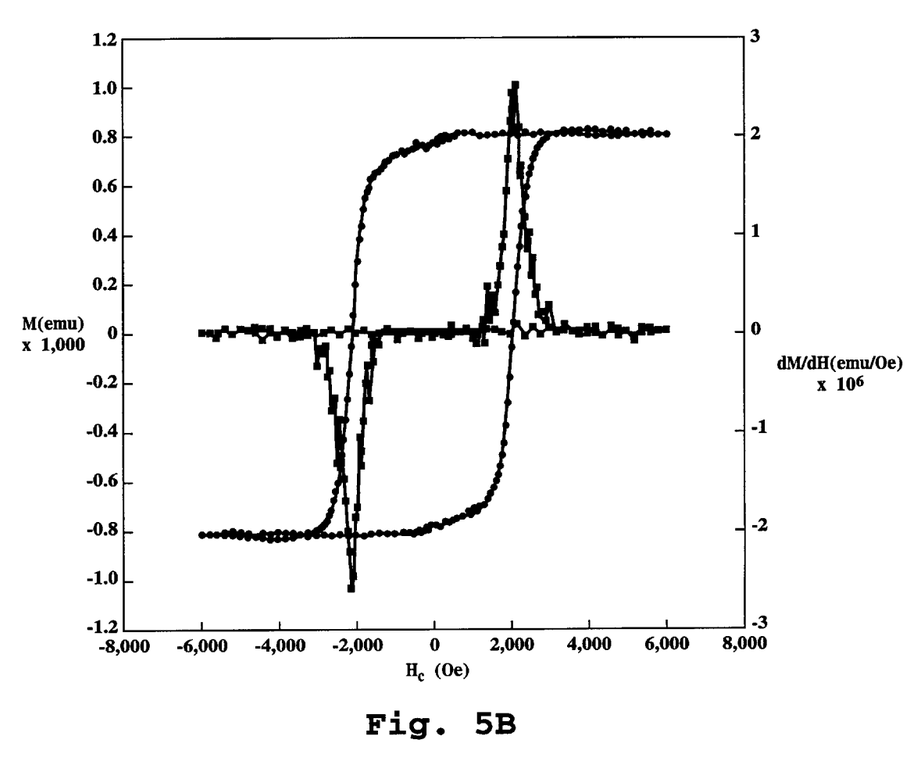

FIG. 5A is a hysteresis loop and its differential for medium no. 1 of Table 1, that is a medium with no interlayer. FIG. 5B is a hysteresis loop and its differential for medium no. 5 which has a 20 Å interlayer. The shape of the loop and the differential curve for the medium having a 20 Å interlayer indicates that the first and second magnetic layers have approximately the same coercive force. The presence of a coercivity gradient in the medium would be evident, particularly in the differential curve where doublet peaks, rather than singlets, would result.

Table 2 compares the parametrics of medium nos. 1, 3 and 5, that is, a medium lacking an interlayer (medium no. 1) to media having a 12 Å (medium no. 3) and a 20 Å (medium no. 5) interlayer. Magnetic testing was carried out on a Guzik Model RWA 1601, using an inductive write head and a magnetoresistive playback head (shield-to-shield gap=0.7 µm, track width=3.5 µm). The head flying height was 2.2 microinches with a linear disc speed of 8 meter/second. The medium transition noise was measured by integrating the noise spectrum over a bandwidth of 40 MHz and subtracting off the electronic and spindle noise. The SNR was obtained from the above spectrum signal divided by the medium transition noise.

As seen in Table 2, media having a paramagnetic interlayer have an increased overwrite (OW), where at the inner diameter of the disc, the overwrite increases 3.50i for a medium having a 12 Å interlayer and increases 8% for a medium having a 20 Å interlayer

TABLE 2

| Medium No. | Interlayer Thickness (Å) | Hc (Oe) | Mrt (memu/cm³) | Hf (uV) | RES (%) | OW (–db) | PW-50 (nS) |
|---|---|---|---|---|---|---|---|
| ID: R = 0.822" (HF: 22.09 MHz) | | | | | | | |
| 1 | 0 | 2415 | 1.06 | 530 | 67 | 40.8 | 28.10 |
| 3 | 12 | 2120 | 1.03 | 512 | 66.6 | 42.2 | 27.85 |
| 5 | 20 | 2164 | 1.03 | 506 | 67 | 44.1 | 27.70 |
| OD: 5 = 1.507" (HF: 37.68 MHz) | | | | | | | |
| 1 | 0 | 2415 | 1.06 | 591 | 71.9 | 42.1 | 16.35 |
| 3 | 12 | 2120 | 1.03 | 566 | 70.8 | 43.5 | 16.15 |
| 5 | 20 | 2164 | 1.03 | 549 | 70.4 | 44.6 | 16.10 |

Figure 6:
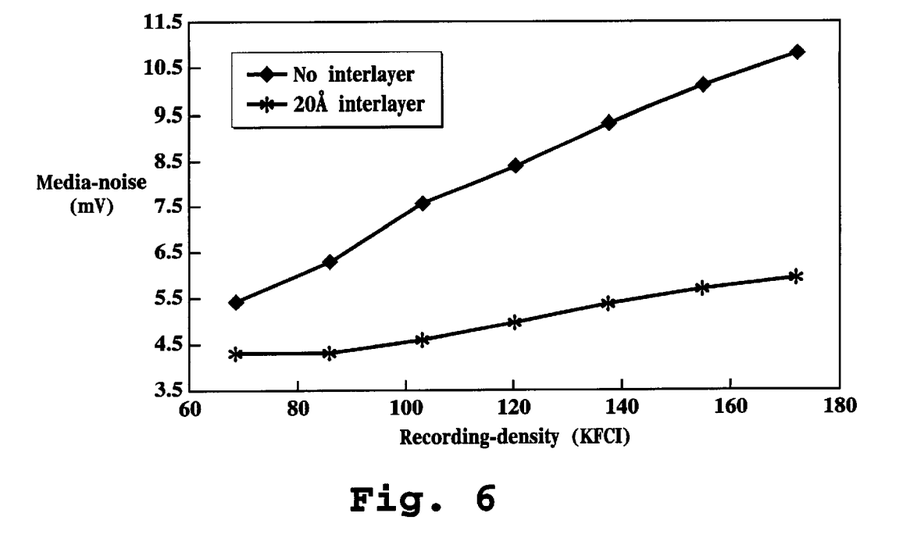
FIG. 6 is a plot of media noise, in mV, as a function of recording density, in kiloflux changes per inch (KFCI) for media having a 20 Å interlayer (*) and for media with no interlayer (♦)

Media prepared according to the invention achieve a significant improvement in media noise. As seen in FIG. 6, a significant reduction in media noise is obtained in media prepared with a 20 Å CoCrNiTa interlayer (*) have a significantly lower media noise level than media with no interlayer (♦). The reduction in media noise was between about 28–45%, over the range of 65–165 KFCI.

Figure 7:
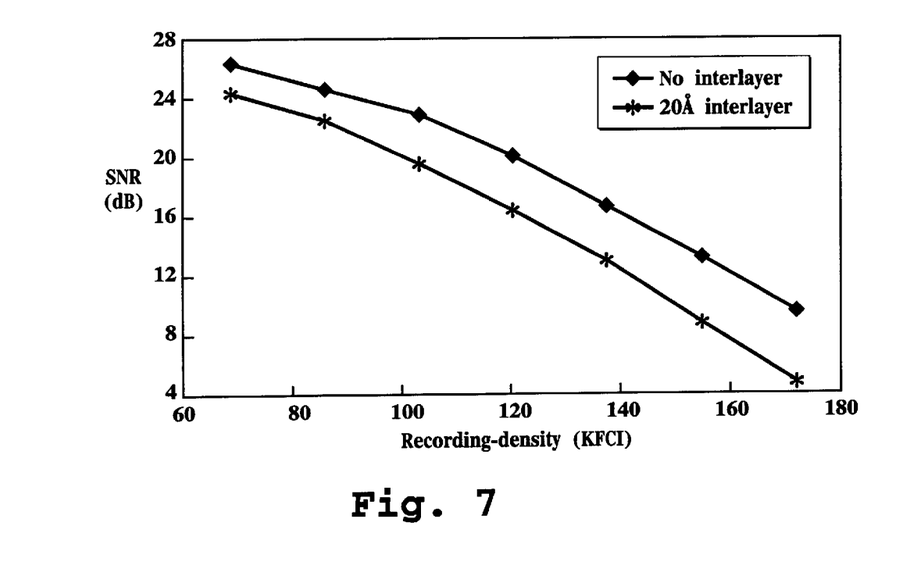
FIG. 7 is a plot of signal-to-noise ratio (SNR), in dB, as a function of recording density, in kiloflux changes per inch (KFCI) for media having a 20 Å interlayer (*) and for media with no interlayer (♦)

FIG. 7 shows signal-to-noise ratio (SNR) as a function of recording density for media having a 20 Å interlayer (*) and for media with no interlayer (♦). The interlayer is effective to achieve an 8–55% increase in SNR over the range of 65–165 KFCI.

Figure 8:
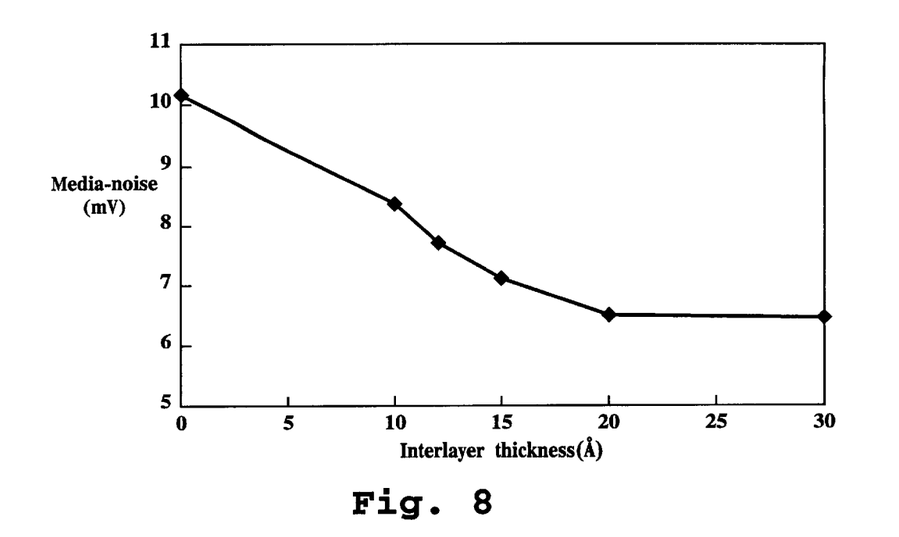
FIG. 8 is a plot of media noise, in mV, as a function of interlayer thickness, in Å, for media at 154.9 KFCI.
Figure 9:
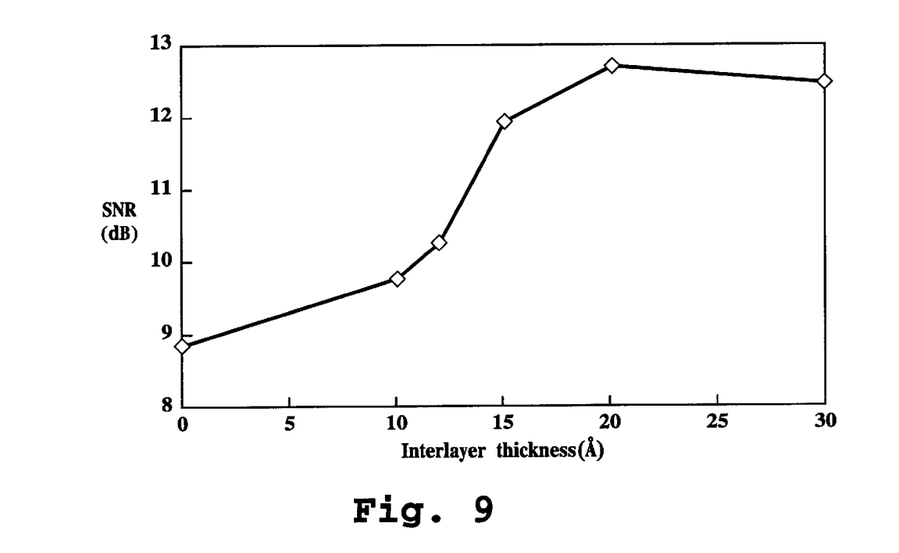
FIG. 9 is a plot of signal-to-noise ratio (SNR), in dB, as a function of interlayer thickness, in Å, for media at 154.9 KFCI.

FIGS. 8 and 9 show the effect of thickness of the interlayer on media noise (FIG. 8) and SNR (FIG. 9) at 154.9 KFCI. As seen, media noise decreases as thickness of the interlayer increases, with the decrease in noise leveling at an interlayer thickness of about 20 Å.

The magnetic interactions between grains in a thin film medium can be measured in terms of a parameter termed $\Delta M$, as has been described (Kelly, et al., 1989; Mayo, et al., 1991). $\Delta M$ provides a measure of the interaction strength in a material and can be used to determine the nature of coupling. A positive value of $\Delta M$ is associated with intergranular exchange coupling or ferromagnetic interaction whereas negative values of $\Delta M$ arise from dipolar type magnetostatic interaction which tend to assist magnetization reversal of the grains. The peak value of $\Delta M$ can be correlated to the noise in the thin film medium.

Figure 10:
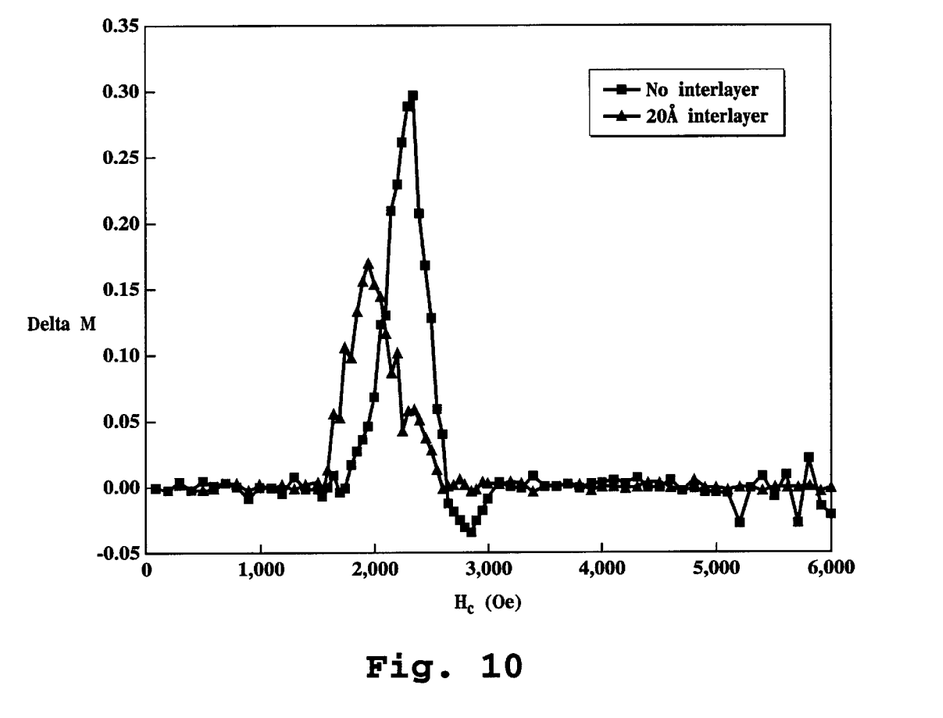
FIG. 10 is a plot of AM as a function of coercivity in Oe for media having a 20 Å interlayer (▲) and for media with no interlayer (■)

FIG. 10 is a plot of $\Delta M$ as a function of coercive field, for media having a 20 Å interlayer (▲) and for media with no interlayer (■). The medium lacking an interlayer shows a sharp increase in $\Delta M$ with increasing field, followed by a sharp collapse of the interaction curve and a small negative region of $\Delta M$. This curve is consistent with exchange interaction between grains, where the interactions initially stabilize the magnetized state followed by rapid bulk cooperative switching of many grains above a critical field. The medium with a 20 Å interlayer shows a maximum interaction peak that is not as high as the medium with no interlayer and a gradient of cooperative switching collapse not as steep. These features indicate a reduction in the coupling, supportive of the media-noise reduction shown in FIGS. 6 and 8.

Figure 11:
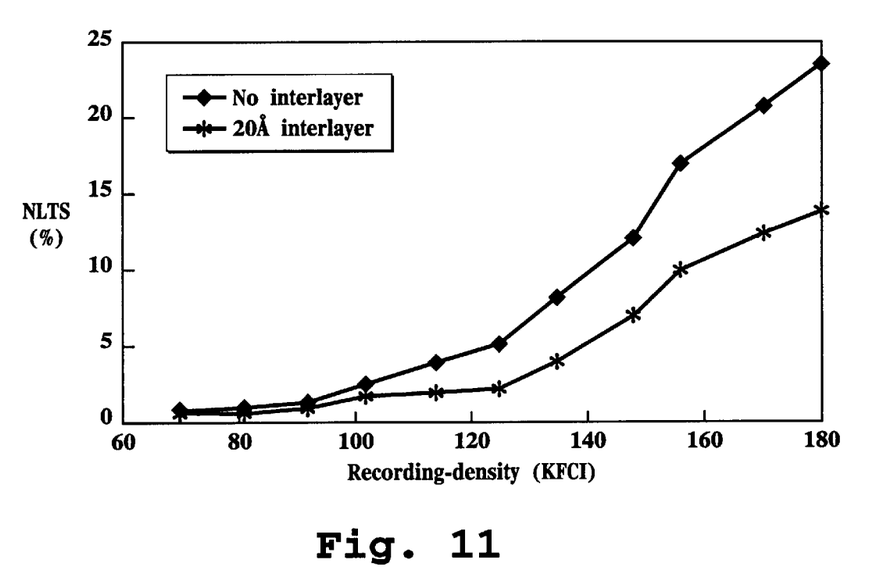
FIG. 11 is a plot of non-linear transition shift (NLTS), in percent, as a function of recording density, in KFCI, for media having a 20 Å interlayer (*) and for media with no interlayer (♦).

FIG. 11 is a plot of non-linear transition shift (NLTS), in percent, as a function of recording density, in KFCI, for media having a 20 Å interlayer (*) and for media with no interlayer (♦). As seen, the medium having an interlayer has about a 7% reduction in NLTS over the range of recording density tested.

From the foregoing, it can be appreciated how various objects and features on the invention are met. The invention provides an improvement in a magnetic recording medium by including in the medium an interlayer deposited between first and second magnetic recording layers. Importantly, the interlayer is effective to reduce the noise of accompanied with an increase in overwrite. The interlayer is composed of a CoCr-based alloy having a saturation magnetization substantially below that normally preferred for magnetic recording, e.g., between about 10–50 emu/cm$^3$. The interlayer is deposited to a thickness between about 5–50 Å and is homogeneous in alloy composition through the layer thickness.

The features of the present invention are illustrated using interlayers composed of CoCrNiTa and a magnetic layer of CoNiCrTa. It will be appreciated that one of skill in the art can readily determine other alloys for the interlayer and the magnetic layer.

IV. EXAMPLES

The Example is intended to illustrate but not limit the scope of the invention.

Example 1

Preparation of Magnetic Recording Media

The magnetic recording media for the experiments conducted in support of the invention were prepared using a DC-magnetron Intevac MDP-250B sputtering apparatus as follows.

Circumferentially textured nickel-phosphorus coated aluminum substrates (95 mm×31.5 mil) were heated to 270° C. using quartz heat lamps prior to sputtering at pressures of 8, 5 and 4 mTorr argon for deposition of the underlayer, interlayer and magnetic layers, respectively.

The media layers were sputtered sequentially from targets composed of the desired alloys. The underlayer of chromium was deposited directly on the NiP-coated substrate, followed by deposition of the first magnetic layer, the interlayer and the second magnetic layer, each in a separate sputtering chamber of the apparatus.

Although the invention has been described with respect to particular embodiments, it will be apparent to those skilled in the art that various changes and modifications can be made without departing from the invention.

It is claimed:

1. An improvement in a magnetic recording medium formed on a rigid substrate and having an underlayer and first and second magnetic recording layers deposited on the underlayer, said improvement comprising an interlayer disposed between said first and second magnetic recording layers, said interlayer (i) composed of a CoCr-based alloy having a saturation magnetization of between 10–50 emu/cm$^3$ and (ii) having a thickness of between 10–30 Å.

2. The medium of claim 1, wherein said interlayer is formed from a CoCr-based alloy and said first and second magnetic layers are formed from a Co-based alloy having the same elemental constituents as the CoCr-based alloy but in different proportions.

3. The medium of claim 2, wherein said CoCr-based alloy is CoNiCrTa.

4. The medium of claim 2, wherein said interlayer is composed of a CoCr-based alloy containing 50–60 atomic percent cobalt, 3–10 atomic percent nickel, 24–50 atomic percent chromium and 1–10 atomic percent tantalum and said magnetic layer is composed of an alloy containing 60–80 atomic percent cobalt, 3–10 atomic percent nickel, 10–20 atomic percent chromium and 2–10 atomic percent tantalum.

5. The medium of claim 2, wherein said CoCr-based alloy is composed of cobalt, chromium and tantalum.

6. The medium of claim 1, wherein said underlayer is composed of chromium.

7. The medium of claim 1, wherein said underlayer is composed of an alloy containing between about 2–20% ruthenium and remainder chromium.

8. The medium of claim 1, wherein said underlayer is composed of an alloy containing between about 2–10% ruthenium and remainder chromium.

9. An improvement in a method of producing a magnetic recording medium by sputtering onto a substrate an underlayer and by sputtering onto said underlayer a first and a second magnetic thin-film layer, said improvement comprising depositing by sputter deposition an interlayer between said first and second magnetic layers, said interlayer (i) composed of a CoCr-based alloy having a saturation magnetization of between 10–50 emu/cm$^3$ and (ii) having a thickness of between 10–30 Å.

10. The method of claim 9, wherein said interlayer is formed from a CoCr-based alloy and said first and second magnetic layers are formed from a Co-based alloy having the same elemental constituents as the CoCr-based alloy but in different proportions.

11. The method of claim 10, wherein said CoCr-based alloy is CoNiCrTa.

12. The method of claim 11, wherein said interlayer is composed of an alloy containing 50–60 atomic percent cobalt, 3–10 atomic percent nickel, 24–50 atomic percent chromium and 1–10 atomic percent tantalum and said magnetic layer is composed of an alloy containing 60–80 atomic percent cobalt, 3–10 atomic percent nickel, 10–20 atomic percent chromium and 2–10 atomic percent tantalum.

13. The method of claim 10, wherein said CoCr-based alloy is composed of cobalt, chromium and tantalum.

14. The method of claim 9, wherein said underlayer is composed of chromium.

15. The method of claim 9, wherein said underlayer is composed of an alloy containing between about 2–20% ruthenium and remainder chromium.

16. The method of claim 9, wherein said underlayer is composed of an alloy containing between about 2–10% ruthenium and remainder chromium.

* * * * *